(12) United States Patent
Green et al.

(10) Patent No.: US 10,575,548 B2
(45) Date of Patent: Mar. 3, 2020

(54) CONTINUOUS COATING METHOD

(71) Applicant: General Mills, Inc., Minneapolis, MN (US)

(72) Inventors: Daniel R. Green, Minnetonka, MN (US); Jekaterina Severova-Epp, Apple Valley, MN (US); Thomas M. Jarl, Golden Valley, MN (US)

(73) Assignee: General Mills, Inc., Minneapolis, MN (US)

( * ) Notice: Subject to any disclaimer, the term of this patent is extended or adjusted under 35 U.S.C. 154(b) by 174 days.

(21) Appl. No.: 14/538,303

(22) Filed: Nov. 11, 2014

(65) Prior Publication Data

US 2015/0335060 A1 Nov. 26, 2015

Related U.S. Application Data

(63) Continuation of application No. PCT/US2014/039249, filed on May 22, 2014.

(51) Int. Cl.
*A23P 20/10* (2016.01)

(52) U.S. Cl.
CPC .................... *A23P 20/10* (2016.08)

(58) Field of Classification Search
CPC .............. A23L 1/005; A23L 1/1641
See application file for complete search history.

(56) References Cited

U.S. PATENT DOCUMENTS

| | | | |
|---|---|---|---|
| 3,246,990 A | 4/1966 | Thompson et al. | |
| 3,318,706 A | 5/1967 | Mckown et al. | |
| 3,464,827 A | 9/1969 | Tsuchiya et al. | |
| 3,600,193 A | 8/1971 | Glabel et al. | |
| 3,615,676 A | 10/1971 | McKown et al. | |
| 3,687,687 A | 8/1972 | Liepa | |
| 3,868,471 A * | 2/1975 | Decelles | A23L 1/1641 426/303 |
| 4,061,790 A | 6/1977 | Cole | |
| 4,075,356 A * | 2/1978 | Haag et al. | 426/285 |
| 4,379,171 A * | 4/1983 | Furda et al. | 426/291 |
| 4,961,943 A | 10/1990 | Blanthorn et al. | |
| 5,010,838 A | 4/1991 | Simelunas et al. | |
| 2005/0064087 A1* | 3/2005 | Richey | A23G 3/0021 426/660 |
| 2005/0266142 A1* | 12/2005 | Green et al. | 426/618 |
| 2006/0286232 A1 | 12/2006 | Shah et al. | |
| 2013/0071523 A1 | 3/2013 | Barrett et al. | |

FOREIGN PATENT DOCUMENTS

WO    WO2012166785    12/2012

* cited by examiner

*Primary Examiner* — D. Lawrence Tarazano
*Assistant Examiner* — Stephanie A Cox
(74) *Attorney, Agent, or Firm* — Diedricks & Whitelaw, PLC; Gregory P. Kaihoi, Esq.

(57) ABSTRACT

Disclosed are methods and systems for continuously coating food pieces. The methods include a steps of directing and uncoated food stream through an enrober to apply a first coating to at least a portion of a surface of each food piece to form a coated stream and continuously redirecting a portion of the coated stream back through the enrober along with the stream of uncoated food pieces to apply at least one additional coating to the portion of the coated stream.

7 Claims, 9 Drawing Sheets

CONTINUOUS COATING METHOD

CROSS REFERENCE TO RELATED APPLICATIONS

This application is a U.S. Patent Application claiming benefit of PCT Application No. PCT/US14/39249, filed May 22, 2014, the entire disclosure of which is incorporated herein by reference.

FIELD OF THE INVENTION

The present invention is directed generally to food products and to their methods of preparation. In particular, the present invention is directed to a continuous coating method for coating food pieces.

BACKGROUND

Coatings are incorporated into foods for various reasons. Coatings can provide protection of food pieces, prevent or delay moisture or oil uptake, maintain a desired moisture content, provide flavor or sweetening, add a nutritional component, provide a desired texture, or provide a desired appearance, among other things.

The number of coatings on a piece of food is generally determined by the method used to apply the coating. Some methods, such as enrobing, can be used to apply a single coating per pass. Some methods of coating food products, such as panning, can result in multiple coatings.

Most current methods result in products that are generally homogenously coated, resulting in a homogenous appearance and texture amongst the coated pieces. There exists, therefore, a need for a continuous coating method that results in a more visually and texturally interesting product.

SUMMARY

Provided herein are methods and compositions relating to coating food pieces.

In one embodiment, a method of making a food composition is provided. The method includes, providing a stream of uncoated food pieces, directing the stream through an enrober to apply a first coating to at least a portion of a surface of each food piece to form a coated stream, and continuously redirecting a portion of the coated stream back through the enrober along with the stream of uncoated food pieces to apply at least one additional coating to the portion of the coated stream. The food pieces can be, for example, ready-to-eat (RTE) cereal pieces, nuts or confections.

The portion of the coated stream that is redirected is from about 20% to about 65% of the coated stream.

The coating can include particulates derived from a RTE cereal product. The coating can include a liquid component and a dry component. The enrober can include a first portion that applies the liquid component and a second portion that applies the dry component.

In an embodiment, a composition is provided including a plurality of food pieces each comprising one or more coatings, the coatings of the plurality of food pieces being distributed over a range of thicknesses representing a range of number of coating layers. The range of number of coating layers can be 1 to 8 layers. Food pieces in the composition having 1 coating layer can represent about 35% to about 80% of the plurality of food pieces. Food pieces in the composition having 2 coats can represent about 16% to about 23% of the plurality of food pieces. Food pieces in the composition having at least 3 coats can represent about 4% to about 42% of the plurality of food pieces.

The food pieces can include, for example, RTE cereal pieces, nuts or confections.

The coatings can include particulates derived from a RTE cereal product.

In another embodiment, a composition is provided including a plurality of base food pieces each coated with a coating, the coating comprising particulates derived from a RTE cereal product. The base food pieces can include RTE cereal pieces. The base food piece and the food piece from which the particulates are derived can be the same or different.

In an embodiment, a system for making a food composition. The system includes an enrober configured to apply a coating to food pieces to produce a stream of coated food pieces, a splitting apparatus configured to split the stream of coated food pieces into at least two stream portions, and a conveyor configured to redirect at least one stream portion back through the enrober.

The system can further include a dryer configured dry the coating prior to the splitting apparatus. The system can further include a second enrober configured to apply a second coating to food pieces. The system can further include a second conveyor configured to direct at least one stream portion through the second enrober. The system can further include an apparatus configured to select coated pieces in the stream of coated food pieces by size or weight.

The enrober can be configured to separately apply a liquid component of the coating and a dry component of the coating.

The at least one stream portion directed to the second enrober can be selected by size or weight.

In an embodiment, an enrober is provided. The enrober includes a first drum-type enrober component configured to apply a liquid component of a coating to a stream of food pieces, a second drum-type enrober component configured to tumble a dry component of the coating with food pieces including the liquid component, a conveyor configured to convey a stream of food pieces from the first drum-type enrober component into the second drum-type enrober component and to convey the dry component into the second drum-type enrober component, and a dispenser component configured to apply the dry component of the coating to the conveyor beneath the stream of food pieces.

Additional objects, features and advantages of the present invention will become more readily apparent from the following detailed description of the invention with reference to the drawings.

BRIEF DESCRIPTION OF THE DRAWINGS

The following drawings are illustrative of particular embodiments of the invention and therefore do not limit the scope of the invention. The drawings are not necessarily to scale (unless so stated) and are intended for use in conjunction with the explanations in the following detailed description. Some embodiments of the invention will hereinafter be described in conjunction with the appended drawings, wherein like numerals denote like elements.

The following detailed description is exemplary in nature and is not intended to limit the scope, applicability, or configuration of the invention in any way. Rather, the following description provides some practical illustrations for implementing exemplary embodiments of the present invention. Examples of constructions, materials, dimensions, and manufacturing processes are provided for selected elements, and all other elements employ that which is known to those of ordinary skill in the field of the invention. Those skilled in the art will recognize that many of the noted examples have a variety of suitable alternatives.

DETAILED DESCRIPTION

The present disclosure is directed to methods of coating food pieces and to compositions comprising coated food pieces. The present methods have particular utility in the provision of coated food pieces of presweetened ready to eat (RTE) cereals, though other food pieces (e.g., nuts, marbits, dried fruits, candies, seeds, puffed popcorn, and the like) are also contemplated. Thus, while steps of the present methods are described in detail below for a RTE cereal product, it is to be understood that the methods and ingredients can be adjusted for coating other food piece types.

Methods provided herein can provide a visually and texturally interesting food product in a continuous coating process by providing a food composition that includes food pieces having coatings distributed over a range of thicknesses.

Figure 1:
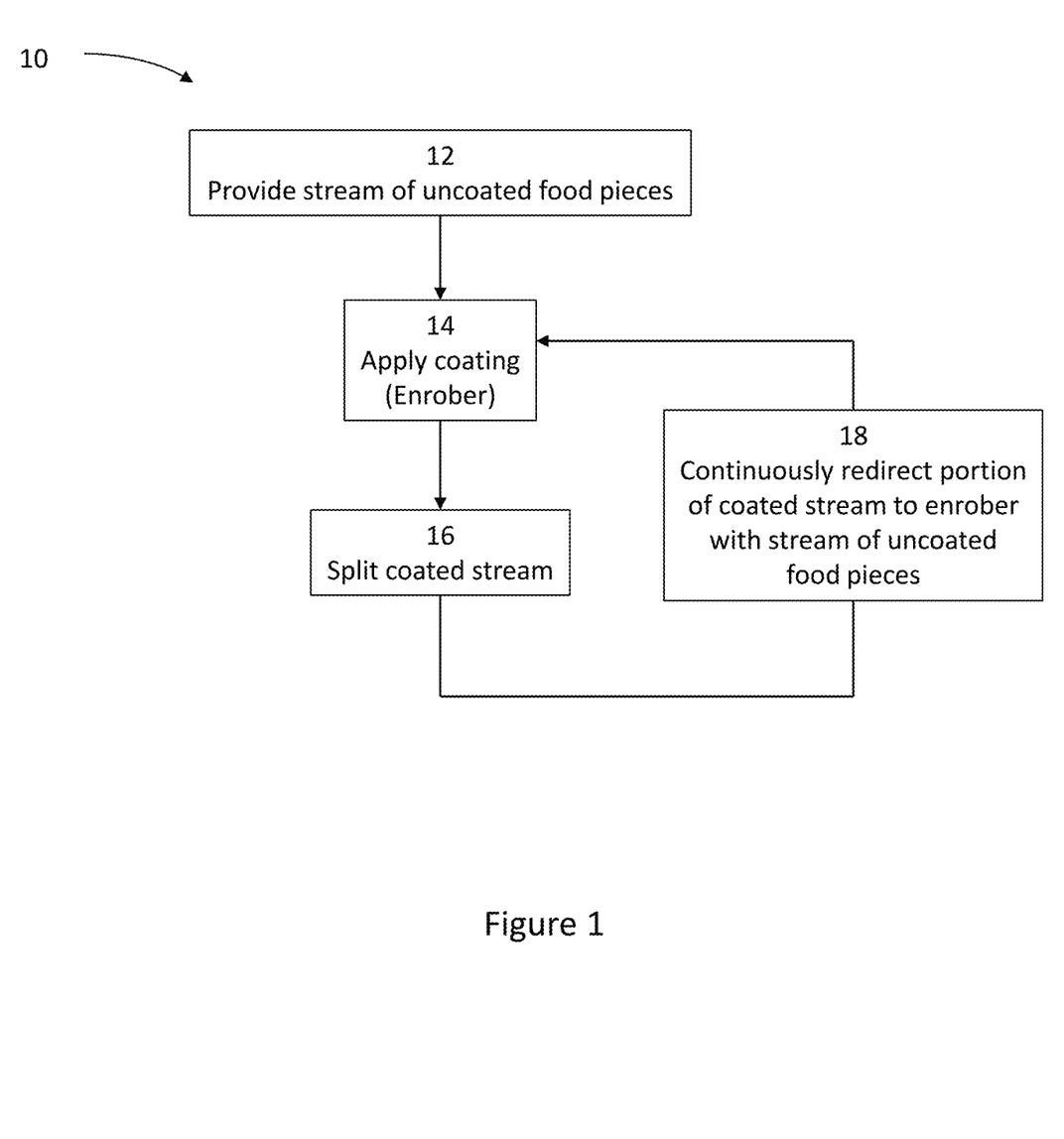
FIG. 1 is a flow diagram representing a method for a continuous coating method for coating food pieces, according to an embodiment.
Figure 2:
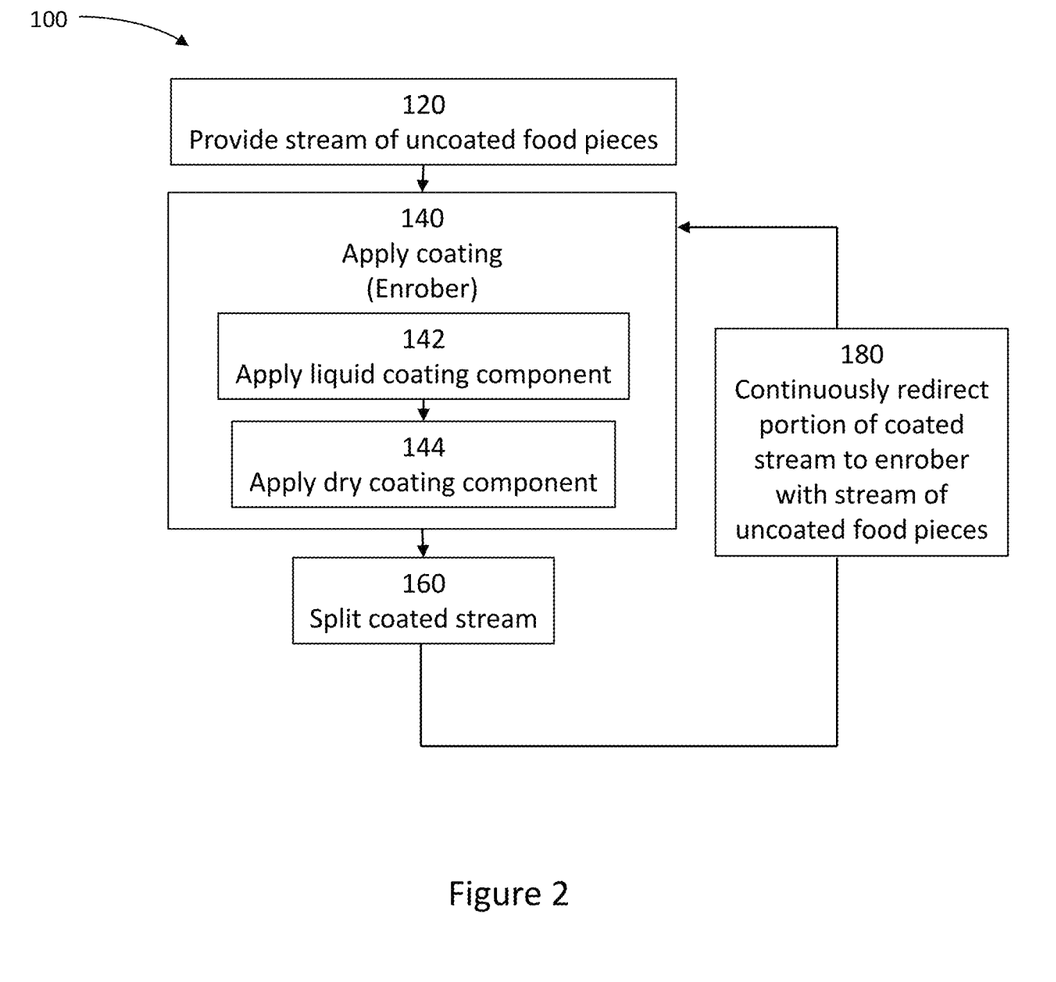
FIG. 2 is a flow diagram representing a method for a continuous coating method for coating food pieces, according to another embodiment.

Referring to FIGS. 1 and 2, a method for continuously coating food pieces includes a step 12, 120 of providing a stream of uncoated food pieces. Uncoated food pieces can be provided in any appropriate manner. In some embodiments, a stream of uncoated food pieces can be provided from a production line. For example, in some embodiments, a method provided herein can be incorporated into an existing method for making a food product. In some embodiments, uncoated food pieces can be produced ahead of time and later fed into a continuous coating method provided herein.

A stream of uncoated food pieces are directed through an enrober to apply a first coating to at least a portion of a surface of each food piece to form a coated stream. Any appropriate coating can be applied. Suitable coatings include, for example a sugar syrup, a fat-based coating (e.g., an oil or chocolate), a particulate (e.g., RTE cereal dust or crumbs, cracker dust or crumbs, cookie dust or crumbs, fruit pieces, granola, seed or nut bits, candy bits, bran, baby oat flakes), seasonings (e.g., cheese powder, herb powders, salt), and the like, or combinations thereof. In some embodiments, particulates resulting from the manufacture of the food pieces to be coated can be included in a coating used in a method provided herein. It is to be understood that a particulate used for coating a food piece as provided herein should be suitably sized for the food piece to be coated. Generally, a particulate suitable for use in a coating of a food piece is significantly smaller (e.g., at least 50% smaller, at least 75% smaller, or at least 90% smaller) than the average size of the food piece to be coated.

In some embodiments, a particulate suitable for use in coating of a food piece is derived from a food piece of the same type as the food piece to be coated. For example, a RTE cereal piece can be coated with a coating comprising a particulate derived from a RTE cereal, though not necessarily of the same type of RTE cereal, or a cookie. A particulate can be derived from a food piece can be produced in any suitable manner. For example, a particulate derived from a food piece can be made during the production of the food piece, such as dust or crumbs collected from the process of making the food piece, or uncoated or coated food pieces can be broken into smaller pieces specifically for the purpose of using the smaller pieces as a dry component of a coating. Coatings including a particulate derived from a food piece can provide a benefit of producing a food product that incorporates a by-product of the production of a food make process, thereby reducing waste. In some embodiments, coating a food piece with a coating that includes a particulate derived from the same or another food piece can result in a coated food piece that is has an interesting flavor, texture, and/or appearance.

In some embodiments, as illustrated in FIG. 1, a coating can be applied in a single step 14. In some embodiments, as illustrated in FIG. 2, a coating can be applied (step 140) in two or more steps (e.g., 142, 144). For example, a liquid component of a coating can be applied (step 142) separately from a dry component of a coating (step 144). In some embodiments, coating in two or more steps can be used to reduce buildup of coating components in or on an enrober. In some embodiments, coating in two or more steps can be used to increase adherence of one or more components to the food pieces. In some embodiments, a method in which a coating is applied in two or more steps can be useful if components in a desired coating do not easily combine, or easily separate, or are otherwise difficult to apply in a single step. For example, a coating that includes a component that can be readily applied with a spray nozzle and a component that would clog a spray nozzle can be applied in two or more steps in order to prevent clogging.

Any amount or rate of application of a coating can be used as appropriate for the type of food piece to be coated. For example, a sugar syrup can be applied to pieces of a RTE cereal base at a rate where the weight ratio of the stream of uncoated pieces to sugar syrup ranges from about 10:1 to about 1:2 (e.g., from about 5:1 to about 1:2, about 2:1 to about 1:2, or about 1:1) to form the coated stream. In some embodiments, a RTE cereal base that has been coated with a sugar syrup can further be coated with a particulate (e.g., a RTE cereal crumb) at a rate where the weight ratio of the stream of uncoated pieces to particulate is from about 1:100 to about 10:1 (e.g., from about 10:1 to about 1:5, about 5:1 to about 1:1, or about 2:1) to form the coated stream. The amount or rate of application of a coating can be adjusted to produce a desired coating and/or to account for the desired distribution of the range of thicknesses of coatings in a composition produced by a method provided herein.

Following the coating step 14, 140, the coated stream is split 16, 160 into two or more portions or substreams. One portion is continuously redirected 18, 180 back to the enrober along with the stream of uncoated food pieces to receive at least one additional coating. Food pieces that are redirected through the enrober to receive at least one additional coating to enter the coated stream. Thus, the continuous redirection step 18, 180 provides for the possibility for a single food piece to pass through the enrober multiple times, with the probability of multiple pass throughs being dependent on the size of the portion that is redirected back to the enrober (i.e., recycle rate).

Figure 5:
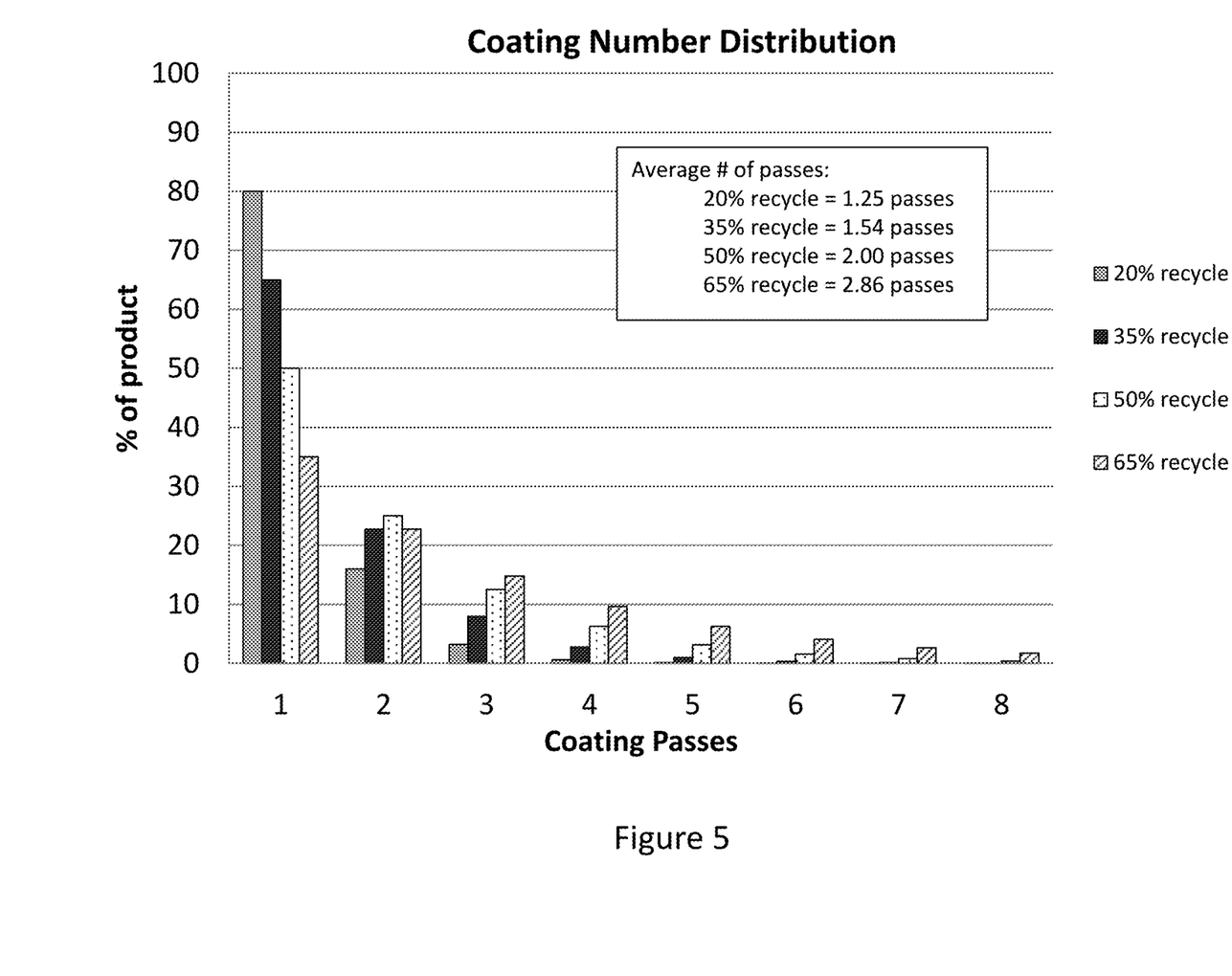
FIG. 5 is a graph showing distributions of coatings on food pieces coated using a continuous coating method using 20%, 35%, 50%, and 65% recycle rates, according to an embodiment.

The recycle rate at step 18, 180 can be from about 10% to about 90% (e.g., from about 20% to about 65%, from about 30% to about 60%, from about 35% to about 80%, about 33%, about 50%, or about 75%) of the coated stream. The recycle rate generally determines the distribution of coating number on food pieces in a food composition produced by a method provided herein. The larger the redirected portion, the greater the portion of food pieces in the composition having more than one coating. The distribution of coating number can be estimated by calculating the proportion of pieces expected to be recoated at each pass through the enrober. The percentage of food pieces expected to have a given number of coatings can be calculated using Formula 1:

$$P = (100 - R) * \left(\frac{R}{100}\right)^{n-1}$$

where P is the proportion as a percentage of food pieces having number of coats n, and R is recycle rate as a percentage. For example, if the recycle rate is 35%, it can be calculated that about 65% of food pieces will pass through the enrober to receive 1 coat, while about 22.8% will receive 2 coats, about 8% will receive 3 coats, about 2.8% will receive 4 coats, and the like. FIG. 5 illustrates the estimated distribution of coating numbers for several examples of recycle rates.

In some embodiments, the portion that is redirected back to the enrober can be selected to result in a desired distribution of coating thicknesses of the final food product. The distribution of coating numbers on food pieces in a food composition produced by a method provided herein can generally correlate with the distribution of thicknesses of coatings on food pieces in the composition. For example, a food piece having 4 coatings applied by a continuous coating method provided herein generally has a thicker coating than a food piece having 2 coatings applied by the same continuous coating method. However, it is to be understood that the number of coatings may not directly correlate with a specific thickness and vice versa. For example, a food piece having 4 coatings applied by a continuous coating method provided herein may not necessarily have a coating that is twice as thick as a coating on a food piece having 2 coatings applied by the same continuous coating method.

In some embodiments, the portion that is redirected back to the enrober can be selected based on the capacity of the equipment used in the method. For example, a portion can be selected based on the capacity of the enrober and/or the feed rate of the stream of uncoated food pieces.

A recycle rate selected for use in a method provided herein need not remain constant or continuous during the method. For example, a recycle rate may be increased or decreased in order to produce a desired product. In another example, recycling can be stopped for a period of time. The distribution of coating numbers on food pieces in a food composition produced by a method having a variable recycle rate can be estimated based on the specific variables involved, such as the feed rate(s) of the stream of uncoated food pieces, the recycle rates used, and the length of time each recycle rate is used.

In some embodiments, a method provided herein can include additional steps. For example, in some embodiments, a coated food stream can be dried (e.g., by passing the coated food stream through a dryer) prior to splitting the coated stream (step 16, 160) or prior to redirecting a portion of the coated stream back to the enrober (step 18, 180). In some embodiments, a size and/or weight selection step can be used to affect distribution of coating thickness and/or number. For example, coated food pieces in a coated stream can be size and/or weight selected prior to splitting the coated stream (step 16, 160) in order to select which pieces to recycle, or food pieces in a coated stream can be size and/or weight selected prior to redirecting a portion of the coated stream back to the enrober (step 18, 180) in order to remove food pieces having a number of coatings that may be too hard or too large for consumption. In some embodiments, food pieces that are removed can broken into smaller pieces for the purpose of using the smaller pieces as a dry component of a coating.

In some embodiments, one or more additional portions of the coated stream can be redirected to one or more additional enrobers to apply coatings. The one or more additional enrobers can be used for a single coating or may be similarly configured to have a subsequent stream split and recycled through them. Coatings applied by the one or more additional enrobers can be the same or differ from the enrober used in step 14, 140.

Figure 3:
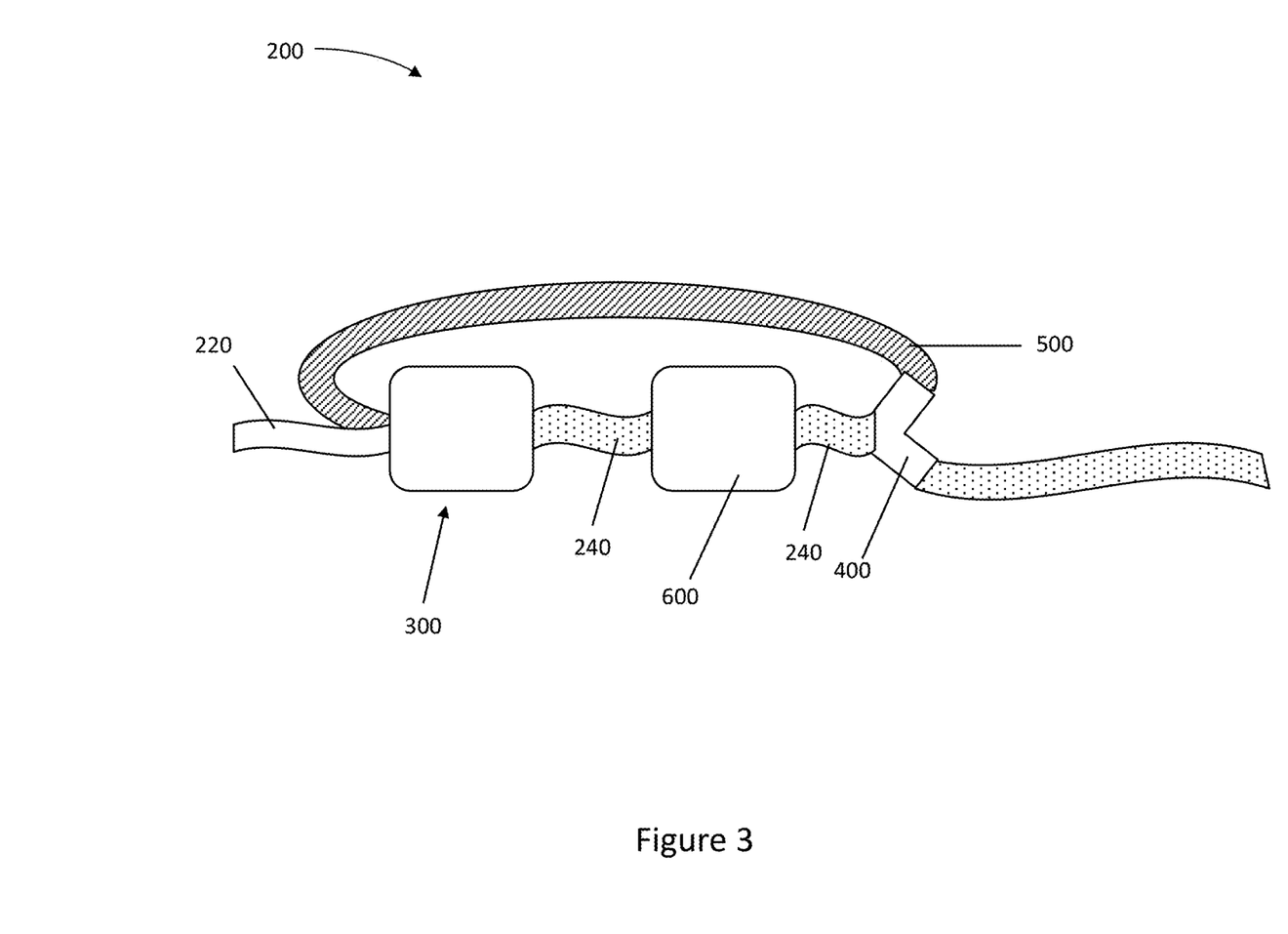
FIG. 3 is a schematic representing a system for coating food pieces, according to an embodiment.

A system for performing a continuous coating method provided herein includes any suitable component for performing the method, as well as any additional steps included in the method. For example, as shown in FIG. 3, a system 200 includes an enrober 300 configured to apply a coating to food pieces from a stream of uncoated food pieces 220 to produce a stream of coated food pieces 240. As used herein, an enrober includes one or more components configured to apply a single coating to a food piece. An enrober can include any appropriate device for applying a coating to food pieces, and can be selected based on the type of coating desired and/or the type of food piece to be coated. For example, a drum-type enrober component can be used to apply a coating (e.g., a sugar syrup) to RTE cereal pieces or food pieces of similar size and/or density. In a drum-type enrober component, the food pieces and the coating and hot concentrated coating formulation are deposited in any order into a rotating drum and tumbled for a sufficient time to achieve an even distribution of the coating on the pieces. In another example, a looped conveyor component can be used to apply a powdered coating to food pieces by tumbling the powdered coating and the food pieces in a similar manner to a drum-type enrober component. In another example, a sprayer or a liquid curtain can be used to apply liquid or fat-based coating to food pieces.

Figure 4:
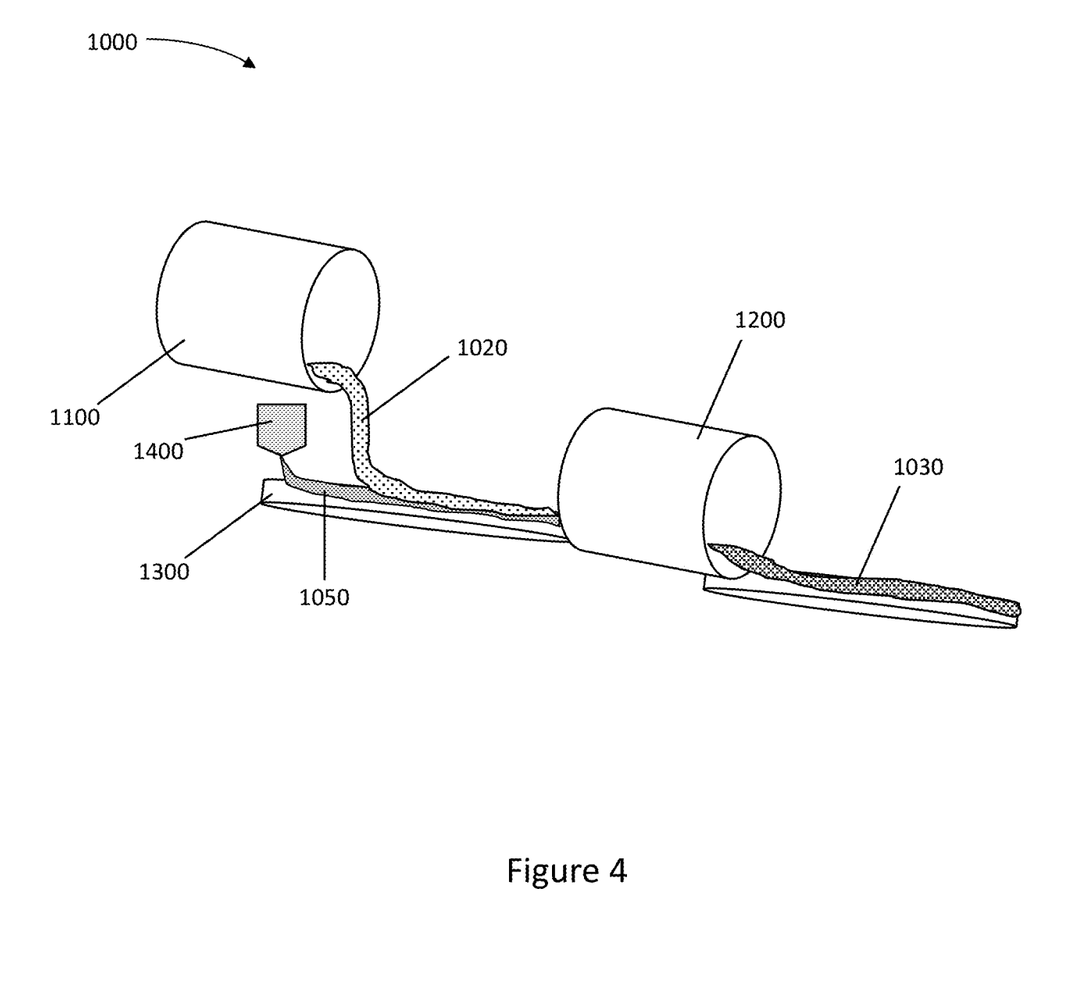
FIG. 4 is a schematic representing a system for coating food pieces, according to another embodiment.

In some embodiments, an enrober can include components that apply a liquid component and a dry component of a coating separately. Such an enrober can reduce buildup of components of the coating in one or more enrober component. For example, as illustrated in FIG. 4, enrober 1000 can include two drum-type enrober components 1100, 1200, where the first drum-type enrober component 1100 is configured to apply a liquid component of a coating (e.g., a sugar syrup and/or an oil) to a stream of uncoated food pieces 1010, and the second drum-type enrober component 1200 applies a dry component of the coating (e.g., a particulate). In some embodiments, the first drum-type enrober component 1100 can feed directly into second drum-type enrober component 1200, where a dry component 1050 of the coating is tumbled with food pieces including the liquid component 1020 to adhere the dry component to the food pieces to form a coated food stream 1030.

In some embodiments, a stream of food pieces including the liquid component 1020 exiting the first drum-type enrober component 1100 can be conveyed by a conveyor 1300 (e.g., a belt conveyor) to the second drum-type enrober component 1200. In some embodiments, enrober 1000 includes a dispenser component 1400 configured to apply a dry component 1050 to the conveyor 1300 beneath the stream of food pieces including the liquid component 1020 can be used to prevent the food pieces including the liquid component 1020 from sticking to conveyor 1300. Dry component 1050 and food pieces including the liquid component 1020 can then be deposited into the second drum-type enrober component 1200, where the dry component 1050 and the food pieces including the liquid component 1020 are tumbled to adhere the dry component 1050 to the food pieces including the liquid component 1020 to form a coated food stream 1030.

A system 200 for performing a continuous coating method also includes a splitting apparatus 400 configured to split the stream of coated food pieces 240 into two or more portions. The splitting apparatus 400 is also configured to direct one portion of the split stream to a conveyor 500 that continuously redirects the portion back through the enrober 300 along with the stream of uncoated food pieces 220. Conveyor 500 can be any suitable apparatus or combination of apparatuses capable of conveying a portion of a coated stream to the enrober 300. For example, in some embodiments, conveyor 500 can include a pneumatic conveyor. Other apparatuses for use as conveyor 500 can include, without limitation, a belt conveyor, a chain conveyor, a screw conveyor, a vibrating conveyor, a roller conveyor, and the like, or combinations thereof.

In some embodiments, a system 200 includes additional components for performing a method provided herein. Examples of additional components include, without limitation a dryer 400 (e.g., a rotary bed, tray, or belt dryer), a sieve or scalper for size selection (not shown), an apparatus for dust and/or crumb removal (e.g., a filter; not shown), a component for storage of coated or uncoated pieces or coating components (e.g., a hopper), and the like. It is to be understood that, in some embodiments, a system 200 can be part of a manufacturing line that includes food piece production upstream and/or drying, packaging, or other processes downstream. For example, a system 200 can be included as part of a manufacturing line for any appropriate food piece base. Systems and methods for making a food piece base are found in, for example, U.S. Pat. No. 3,464,827, (issued Sep. 2, 1969 to T. Tsuchiya, et al.); U.S. Pat. No. 3,600,193, (issued Aug. 17, 1971 to E. F. Glabel, et al.); U.S. Pat. No. 3,246,990, (issued Apr. 19, 1966 to Thompson, et al.); and U.S. Pat. No. 3,687,687, (issued Aug. 29, 1972 to A. L. Liepa), each of which is incorporated herein by reference. Conventionally, a coated RTE cereal coated with a with a sugar syrup coating is subjected to a drying step to provide a shelf stable product.

For those food products requiring low moisture contents, drying can be performed prior to coating. Typically, for example, puffed cereal bases are dried to relatively low moisture contents (e.g., less than about 10%) in order to have the desired crispness or frangibility.

Figure 6:
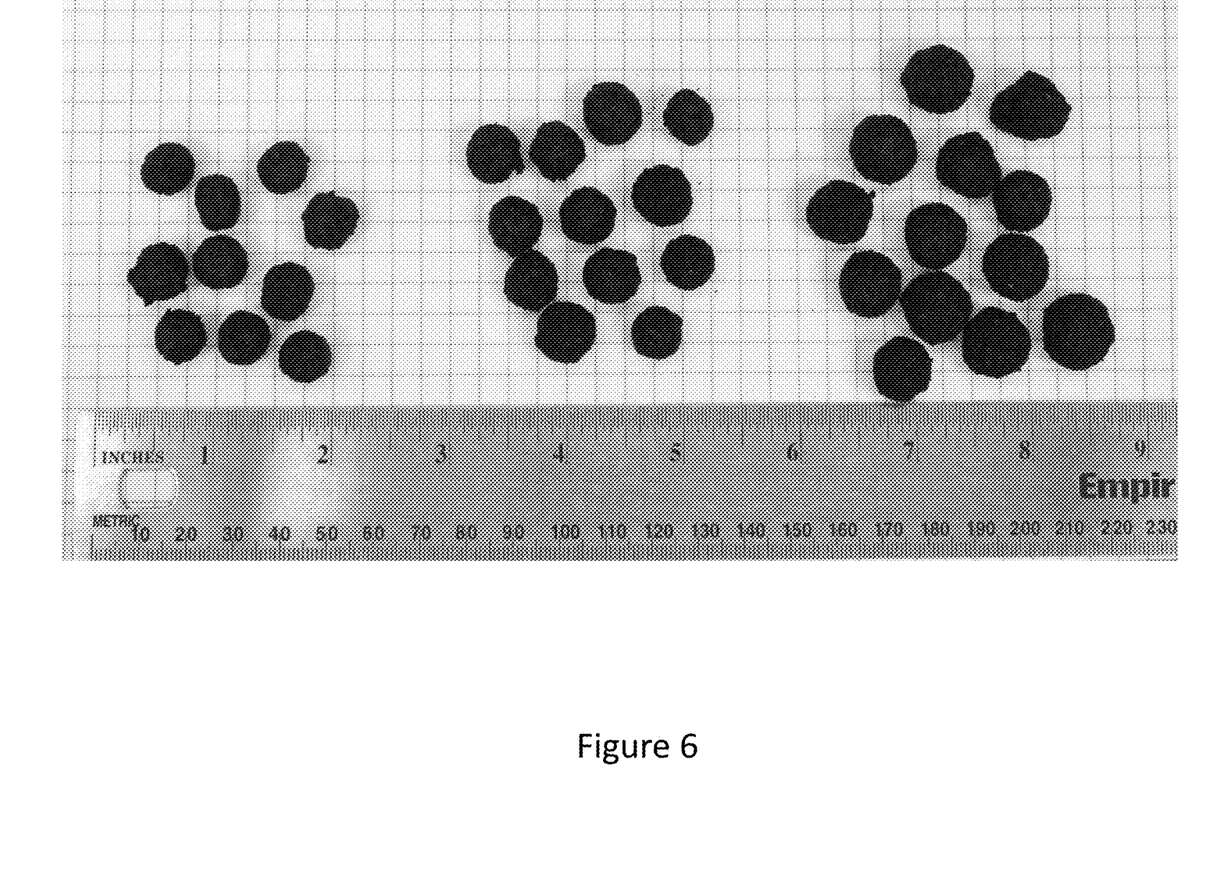
FIG. 6 is a photograph of sample food pieces coated using a continuous coating method with a 50% recycle rate, according to an embodiment.

A food composition is provided herein that includes a plurality of base food pieces each coated with one or more coatings distributed over a range. As described above, the distribution of coating numbers can be estimated by calculating the proportion of pieces expected to be recoated at each pass through the enrober by using Formula 1. In some embodiments, the distribution of coating numbers can generally correlate with a distribution of coating thicknesses. A food composition that includes a plurality of base food pieces each coated with one or more coatings distributed over a range can be identified using any appropriate method. For example, in some embodiments, a distribution of coating thicknesses can be estimated by individually measuring coat thicknesses from cross-sections of a plurality of coated food pieces. In some embodiments, a distribution of coating thicknesses can be estimated by individually weighing a plurality of coated food pieces. In some embodiments, a distribution of coating thicknesses can be estimated by individually measuring the size of a plurality of coated food pieces, as illustrated in FIG. 6.

EXAMPLES

Example 1

A light colored, unsweetened, puffed corn RTE cereal with a moisture content of about 7% that was roughly spherical in shape was fed at a rate of about 13 pounds per minute into a rotating drum-type enrober component (drum 1). A liquid component comprising a sugar slurry (~21% moisture) and an oil was sprayed into drum 1 at a rate of 14 pounds per minute sugar slurry and 0.4 pounds per minute oil. The RTE cereal was then deposited onto a belt-type conveyor that had crumbs from a dark colored, chocolate flavored cookie (~4% moisture) applied to it at a rate of about 7 pounds per minute. The RTE cereal and crumbs were conveyed into a second rotating drum-type enrober component (drum 2) where the RTE cereal and crumbs were tumbled to adhere the crumbs to the RTE cereal to form coated cereal pieces. The coated cereal pieces were dried to a moisture content of about 2% in a drier and exited the drier in a stream at a rate of about 62 pounds per minute. The stream of coated and dried pieces was split in half (recycle rate of 50%) and half of the coated, dried pieces were redirected back to drum 1 using a pneumatic conveyor, to enter drum 1 along with the uncoated stream. The remainder of the stream of coated and dried pieces were collected for testing.

FIG. 6 shows pieces of finished cereal sampled after about 2 hours of continuous recycling at a 50% recycle rate. Pieces ranged in size of from about 0.5 inches to about 0.75 inches. Sugar content was measured and is provided in Table 1. It was observed that smaller pieces collected from a continuous coating system had a lower sugar content than expected compared to pieces coated only once in a non-recycled system. Without being bound to theory, it may be that pieces already having at least 1 coating may receive a larger proportion of slurry than expected due to a greater surface area, therefore reducing the amount of slurry adhering to uncoated pieces. However, the overall sugar content per serving in a cereal made using a continuous coating/recycle method was similar to a cereal made with no recycling and a single coating.

| Sample | Total sugar (%) | g sugar per 30 g serving |
| --- | --- | --- |
| No recycle #1 | 32 | 9.7 |
| No recycle #2 | 31 | 9.3 |
| Recycle #1 | 33 | 10 |
| Recycle #2 | 34 | 10.2 |
| Recycle - large pieces only | 46 | 13.8 |
| Recycle - small pieces only | 34 | 7.2 |

Figure 7:
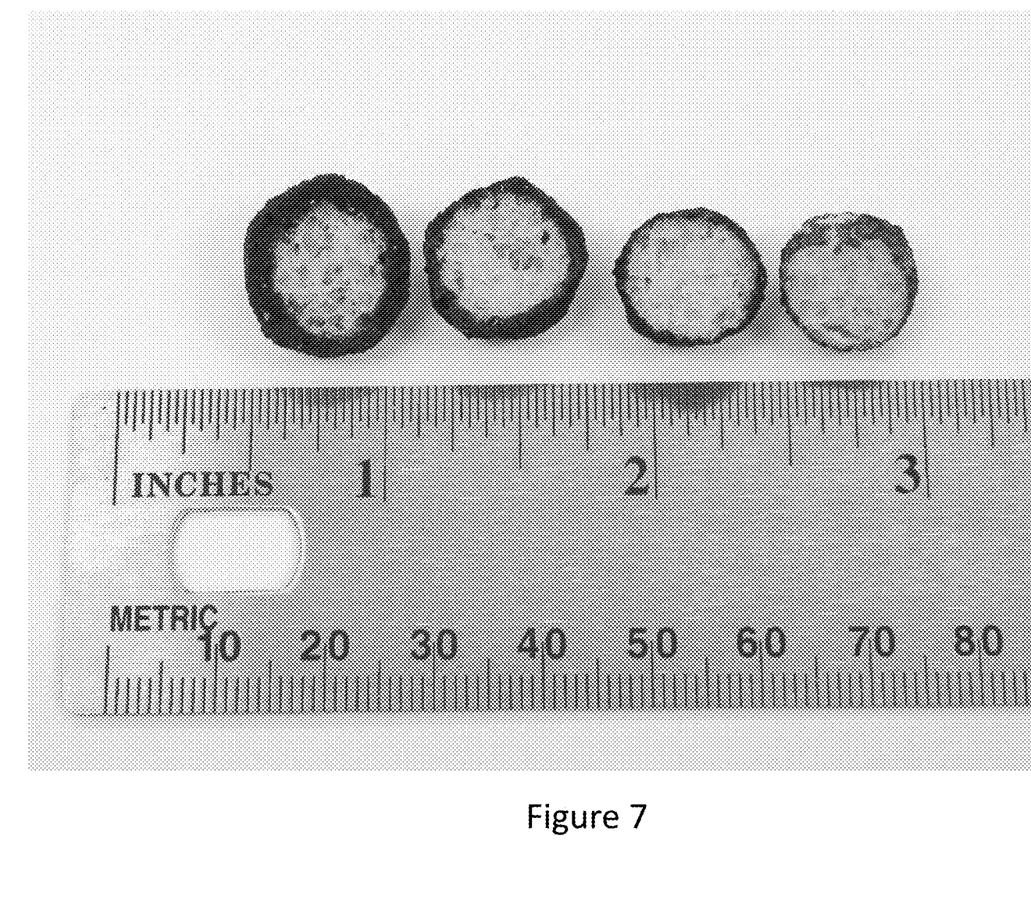
FIG. 7 is a photograph of cross sections of samples of food pieces coated using a continuous coating method with a 50% recycle rate, according to an embodiment.

Pictures of cross sections of pieces produced by a continuous coating/recycle process are shown in FIG. 7, showing a range of coating thicknesses. It was observed that, after 2 hours of recycling, pieces with more coatings had a smoother appearance than pieces with fewer coatings. Without being bound to theory, it is possible that as pieces are recycled, the coatings are abraded smooth. It is also possible that a greater number of coatings fill in rough areas in the coating.

Example 2

A light colored, unsweetened, puffed corn RTE cereal with a moisture content of about 7% that was roughly spherical in shape was fed at a rate of about 13 pounds per minute into a rotating drum-type enrober component (drum 1). A liquid component comprising a sugar slurry (~21% moisture) and an oil was sprayed into drum 1 at a rate of 14 pounds per minute sugar slurry and 0.4 pounds per minute oil. The RTE cereal was then deposited onto a belt-type conveyor that had crumbs from a light colored, graham cracker flavored RTE cereal (~2% moisture) applied to it at a rate of about 7 pounds per minute. The RTE cereal and crumbs were conveyed into a second rotating drum-type enrober component (drum 2) where the RTE cereal and crumbs were tumbled to adhere the crumbs to the RTE cereal to form coated cereal pieces. The coated cereal pieces were dried to a moisture content of about 2% in a drier and exited the drier in a stream at a rate of about 62 pounds per minute. The stream of coated and dried pieces was split in half (recycle rate of 50%) and half of the coated, dried pieces were redirected back to drum 1 using a pneumatic conveyor, to enter drum 1 along with the uncoated stream. The remainder of the stream of coated and dried pieces were collected for testing.

Figure 8:
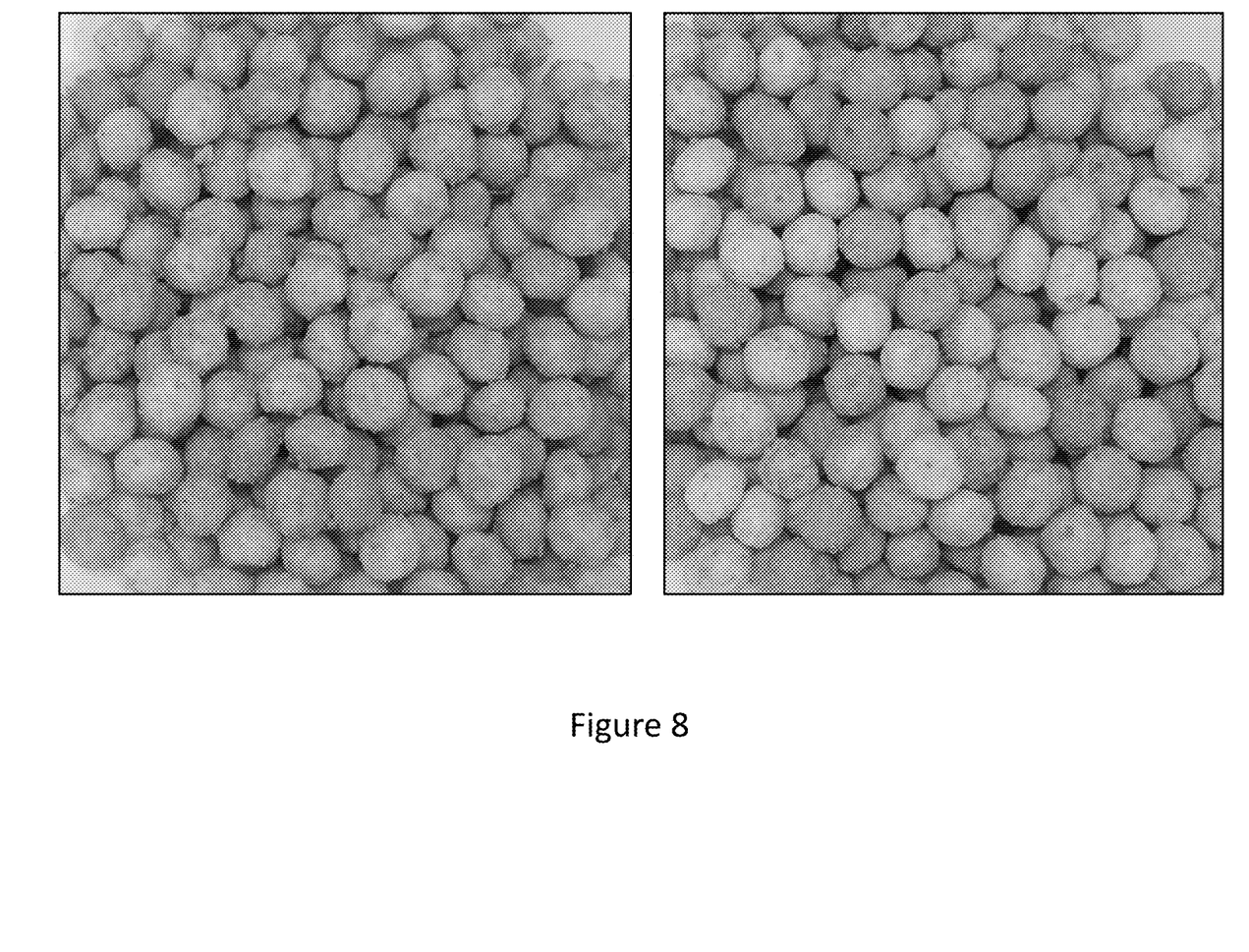
FIG. 8 is a set of photographs showing samples of food pieces coated with a coating comprising particulates derived from a RTE cereal, according to an embodiment.

FIG. 8 shows pieces of finished cereal sampled after a single pass (left side), prior to beginning recycling, and about 1 hour of continuous recycling at a 50% recycle rate (right side). As in Example 1, it was observed that recycled pieces had a smoother appearance. It was also observed that, before recycling began, pieces with a single coating appeared to have a thicker coating than pieces presumed to have received a single coating after recycling began.

Example 3

Figure 9:
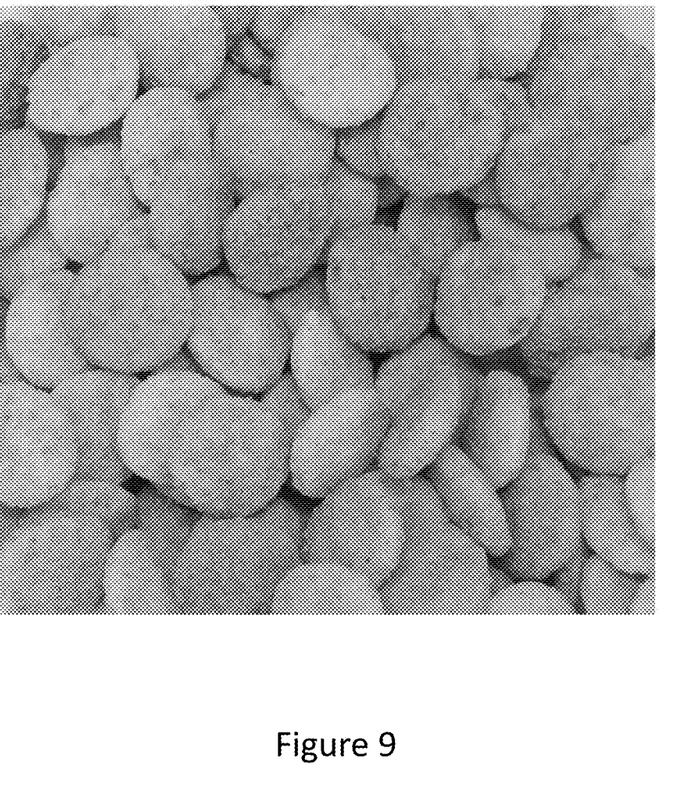
FIG. 9 is a set of photographs showing sample of food pieces coated with a coating comprising particulates derived from a RTE cereal, according to an embodiment.

The procedure described in Example 2 was performed using a RTE cereal having a flat, circular shape rather than a spherical shape. FIG. 9 shows pieces of finished cereal sampled after continuous recycling at a 50% recycle rate.

It is to be understood that the described invention is not to be limited to the disclosed embodiment, but on the contrary, is intended to cover various modifications and equivalent arrangements included within the spirit and scope of the appended claims.

The invention claimed is:

1. A method of making a food composition, comprising:
   a. providing a stream of uncoated food pieces;
   b. directing the stream through an enrober to apply a first coating to at least a portion of a surface of each food piece to form a coated stream;
   c. drying the coated stream to produce a stream of dried coated food pieces;
   d. splitting the stream of dried coated food pieces into at least two stream portions using a splitting apparatus;
   e. selecting a stream portion representing from about 20% to about 65% of the stream of dried coated pieces; and
   f. continuously redirecting the selected stream portion using a pneumatic conveyor, a belt conveyor, a chain conveyor, a screw conveyor, a vibrating conveyor, a roller conveyor, or a combination thereof back through the enrober along with the stream of uncoated food pieces to apply at least one additional coating to the portion of the coated stream to produce a food composition comprising a plurality of food pieces, wherein food pieces having 1 coating layer represent about 35% to about 80% of the plurality of food pieces, food pieces having 2 coating layers represent about 16% to about 23% of the plurality of food pieces, and food pieces having at least 3 coating layers represent about 4% to about 42% of the plurality of food pieces.

2. The method of claim 1, wherein the food pieces are ready-to-eat (RTE) cereal pieces.

3. The method of claim 1, wherein the food pieces are nuts or confections.

4. The method of claim 1, wherein the selected stream portion represents about 30% to about 60% of the stream of dried coated pieces.

5. The method of claim 1, wherein the coating comprises particulates derived from a ready-to-eat (RTE) cereal product.

6. The method of claim 1, wherein the coating comprises a liquid component and a dry component.

7. The method of claim 6, wherein the enrober comprises a first portion that applies the liquid component and a second portion that applies the dry component.

\* \* \* \* \*